United States Patent
Modi et al.

(10) Patent No.: US 11,175,185 B2
(45) Date of Patent: *Nov. 16, 2021

(54) METHOD, APPARATUS AND SYSTEM FOR PASSIVE INFRARED SENSOR FRAMEWORK

(71) Applicant: GOOGLE LLC, Mountain View, CA (US)

(72) Inventors: Yash Modi, San Mateo, CA (US); Mark Rajan Malhotra, San Mateo, CA (US); Gwendolyn van der Linden, Redwood City, CA (US); Dongeek Shin, Mountain View, CA (US); Michael Dixon, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,047

(22) Filed: Jun. 5, 2020

(65) Prior Publication Data
US 2020/0300707 A1  Sep. 24, 2020

Related U.S. Application Data

(63) Continuation of application No. 15/430,256, filed on Feb. 10, 2017, now Pat. No. 10,712,204.

(51) Int. Cl.
*G01J 5/00* (2006.01)
*G08B 13/193* (2006.01)
(Continued)

(52) U.S. Cl.
CPC ............ *G01J 5/0025* (2013.01); *G01J 5/025* (2013.01); *G01J 5/10* (2013.01); *G06K 9/00771* (2013.01);
(Continued)

(58) Field of Classification Search
CPC ............ G01J 5/10; G01J 5/025; G01J 5/0025; G06K 9/00771; G08B 13/191; G08B 13/193; G08B 13/19602; G08B 29/188
See application file for complete search history.

(56) References Cited

U.S. PATENT DOCUMENTS

| 6,710,345 B2 | 3/2004 | Carter |
| 8,886,489 B2 | 11/2014 | Patel |

(Continued)

FOREIGN PATENT DOCUMENTS

| CN | 104462740 | 3/2015 |
| EP | 1705612 | 9/2006 |

(Continued)

OTHER PUBLICATIONS

Extended European Search Report dated May 29, 2018 for EP17198599. 7, 8 pages.

(Continued)

*Primary Examiner* — Douglas Kay
(74) *Attorney, Agent, or Firm* — Butzel Long; Donald J. Lecher

(57) ABSTRACT

A method includes detecting, with a passive infrared sensor (PIR), a level of infrared radiation in a field of view (FOV) of the PIR, generating a signal based on detected levels over a period of time, the signal having values that exhibit a change in the detected levels, extracting a local feature from a sample of the signal, wherein the local feature indicates a probability that a human in the FOV caused the change in the detected levels, extracting a global feature from the sample of the signal, wherein the global feature indicates a probability that an environmental radiation source caused the change in the detected levels, determining a score based (Continued)

on the local feature and the global feature, and determining that a human motion has been detected in the FOV based on the score.

22 Claims, 7 Drawing Sheets

(51) Int. Cl.
*G08B 13/191* (2006.01)
*G06K 9/00* (2006.01)
*G08B 13/196* (2006.01)
*G08B 29/18* (2006.01)
*G01J 5/02* (2006.01)
*G01J 5/10* (2006.01)

(52) U.S. Cl.
CPC ......... *G08B 13/191* (2013.01); *G08B 13/193* (2013.01); *G08B 13/19602* (2013.01); *G08B 29/188* (2013.01)

(56) References Cited

U.S. PATENT DOCUMENTS

| 10,209,124 | B2 | 2/2019 | Monaci | |
| 10,712,204 | B2* | 7/2020 | Modi | G01J 5/10 |
| 2002/0123975 | A1 | 9/2002 | Poluzzi | |
| 2002/0161547 | A1 | 10/2002 | Fidler | |
| 2003/0088412 | A1 | 5/2003 | Shetty | |
| 2007/0023662 | A1* | 2/2007 | Brady | G01J 5/0022 |
| | | | | 250/338.3 |
| 2007/0241863 | A1* | 10/2007 | Udagawa | G06K 9/00711 |
| | | | | 340/5.83 |
| 2012/0300587 | A1* | 11/2012 | Azimi-Sadjadi | G01S 3/808 |
| | | | | 367/127 |
| 2013/0137450 | A1* | 5/2013 | Dai | G01S 19/48 |
| | | | | 455/456.1 |
| 2014/0270402 | A1 | 9/2014 | Condell | |
| 2016/0330396 | A1 | 11/2016 | Garcia Navarro | |
| 2017/0083091 | A1* | 3/2017 | Okamoto | G06F 3/0346 |
| 2018/0231419 | A1* | 8/2018 | Modi | G01J 5/0025 |
| 2020/0300972 | A1* | 9/2020 | Wang | A61B 5/7207 |

FOREIGN PATENT DOCUMENTS

| GB | 2339277 | 1/2000 |
| WO | 20130128307 | 9/2013 |
| WO | 2016064562 | 4/2016 |

OTHER PUBLICATIONS

Bahrampou, "Performance Comparison of Feature Extraction Algorithms for Target Detection and Classification", Pattern Recognition Letters, vol. 34, Issue 16, Dec. 1, 2013, pp. 2126-2134.
Gong, "Human and Nonhuman Recognition Using Pyroelectric Infrared Detector", Int J Thermophys (2012) 33, Jul. 28, 2012, pp. 2237-2241.
Liu, "Distributed Infrared Biometric Sensing for Lightweight Human Identification Systems", Proceedings of the 8th World Congress on Intelligent Control and Automation, Jul. 6-9, 2010, China, pp. 6969-6974.
Abu Sanjana, "A Low-Complexity Algorithm for Intrusion Detection in a PIR-Based Wireless Sensor Network", 2009 International Conference on Intelligent Sensors, Sensor Networks and Information Processing (ISSNIP), Australia, Dec. 7-10, 2009, pp. 337-342.
Zhao, "EMD-Based Symbolic Dynamic Analysis for the Recognition of Human and Nonhuman Pyroelectric Inftared Signals",Sensors 2016, 16(1), 126; https://doi.org/10.3390/s16010126, Jan. 20, 2016. pp. 1-14.
Kallur (D. C. Kallur, "Human localization and activity recognition using distributed motion sensors", for the degree of Master of Science, Jul. 2014, Visvesvaraya Technological University, Belgaum, Karnataka) (Year: 2014).

* cited by examiner

METHOD, APPARATUS AND SYSTEM FOR PASSIVE INFRARED SENSOR FRAMEWORK

RELATED APPLICATIONS

This application is a continuation application from U.S. Application Ser. No. 15/430,256 filed on Feb. 10, 2017 which is U.S. Pat. No. 10,712,204 issued on DATE.

BACKGROUND

Passive infrared (PIR) sensors can detect human motion by measuring infrared variations in a scene. Applications for PIR sensing include, for example, automatic indoor light switching from occupancy, intrusion detection for security, etc. In practice, many noise sources, such as internal device noise or external interference from heaters, can generate strong signals comparable to those of humans, and can falsely trigger the PIR device for human motion.

BRIEF SUMMARY

According to an embodiment of the disclosed subject matter, a method includes detecting, with a passive infrared sensor (PIR), a level of infrared radiation in a field of view (FOV) of the PIR, generating a signal based on detected levels over a period of time, the signal having values that exhibit a change in the detected levels, extracting a local feature from a sample of the signal, wherein the local feature indicates a probability that a human in the FOV caused the change in the detected levels, extracting a global feature from the sample of the signal, wherein the global feature indicates a probability that an environmental radiation source caused the change in the detected levels, determining a score based on the local feature and the global feature, and determining that a human motion has been detected in the FOV based on the score.

According to an embodiment of the disclosed subject matter, a passive infrared (PIR) sensor device includes a plurality of radiation sensitive elements that detect a radiation level in a field of view (FOV) and generate charges based on the detected radiation level, a circuit that receives the generated charges and generates a signal based on the charges, and a processor that receives the signal and extracts a local feature and a global feature from a sample of the signal, the local feature indicating a probability that a human in the FOV caused the change in the detected levels and the global feature indicating a probability that an environmental radiation source caused the change in the detected levels, wherein the processor is configured to determine a score based on the local feature and the global feature and to determine that a human motion has been detected in the FOV based on the score.

According to an embodiment of the disclosed subject matter, a system includes a network, a controller configured to transmit and receive data through the network, and at least one passive infrared (PIR) sensor device configured to transmit data to the controller through the network, the PIR sensor device including a plurality of radiation sensitive elements that detect a radiation level in a field of view (FOV) and generate charges based on the detected radiation level, a circuit that receives the generated charges and generates a signal based on the charges, and a processor that receives the signal and extracts a local feature and a global feature from a sample of the signal, the local feature indicating a probability that a human in the FOV caused the change in the detected levels and the global feature indicating a probability that an environmental radiation source caused the change in the detected levels, wherein the processor is configured to determine a score based on the local feature and the global feature and to determine that a human motion has been detected in the FOV based on the score.

According to an embodiment of the disclosed subject matter, means for detecting, with a passive infrared sensor (PIR), a level of infrared radiation in a field of view (FOV) of the PIR, generating a signal based on detected levels over a period of time, the signal having values that exhibit a change in the detected levels, extracting a local feature from a sample of the signal, wherein the local feature indicates a probability that a human in the FOV caused the change in the detected levels, extracting a global feature from the sample of the signal, wherein the global feature indicates a probability that an environmental radiation source caused the change in the detected levels, determining a score based on the local feature and the global feature, determining that a human motion has been detected in the FOV based on the score, are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
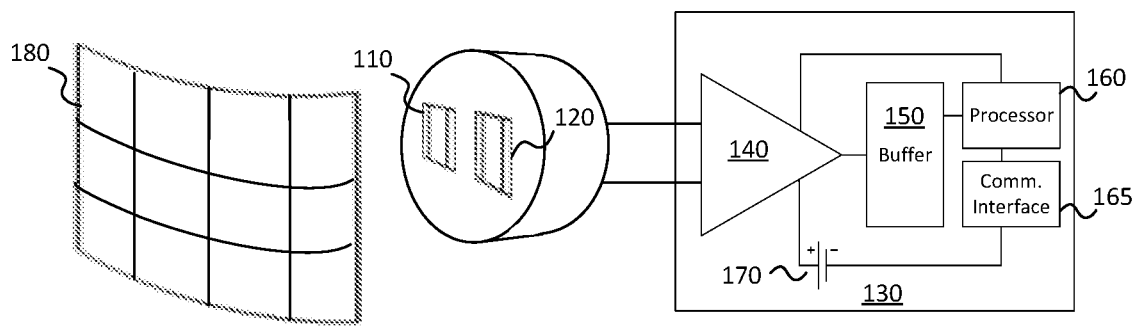
FIG. 1A shows a passive infrared (PIR) sensor device, according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

A passive infrared (PIR) sensor framework is disclosed herein that reduces the negative effects of environmental noise on accuracy, has a low computational complexity, and improves battery life.

Generally, a PIR sensor can detect infrared radiation emanating from a source within the sensor's field of view (FOV). FIG. 1A shows a PIR sensor 100. The sensor 100 can include two radiation-sensitive elements 110, 120 connected to generate opposite charges when hit by incident radiation. For example, 110 can produce a positive charge and 120 can produce a negative charge. The sensor 100 includes circuitry 130 to transform the charges into a signal voltage and process the signal. For example, circuitry 130 can include an amplifier 140 to amplify a signal, a buffer 150 to store signal samples, a processor 160 to process the signal samples, a communications interface 165 to transmit data and notifications, and a battery 170 to power the sensor 100.

The sensor 100 can be disposed in a housing (not shown) including a Fresnel lens/array 180 positioned to function as a focusing device that partitions the sensor's FOV into a one or more distributed zones.

Figure 1B:
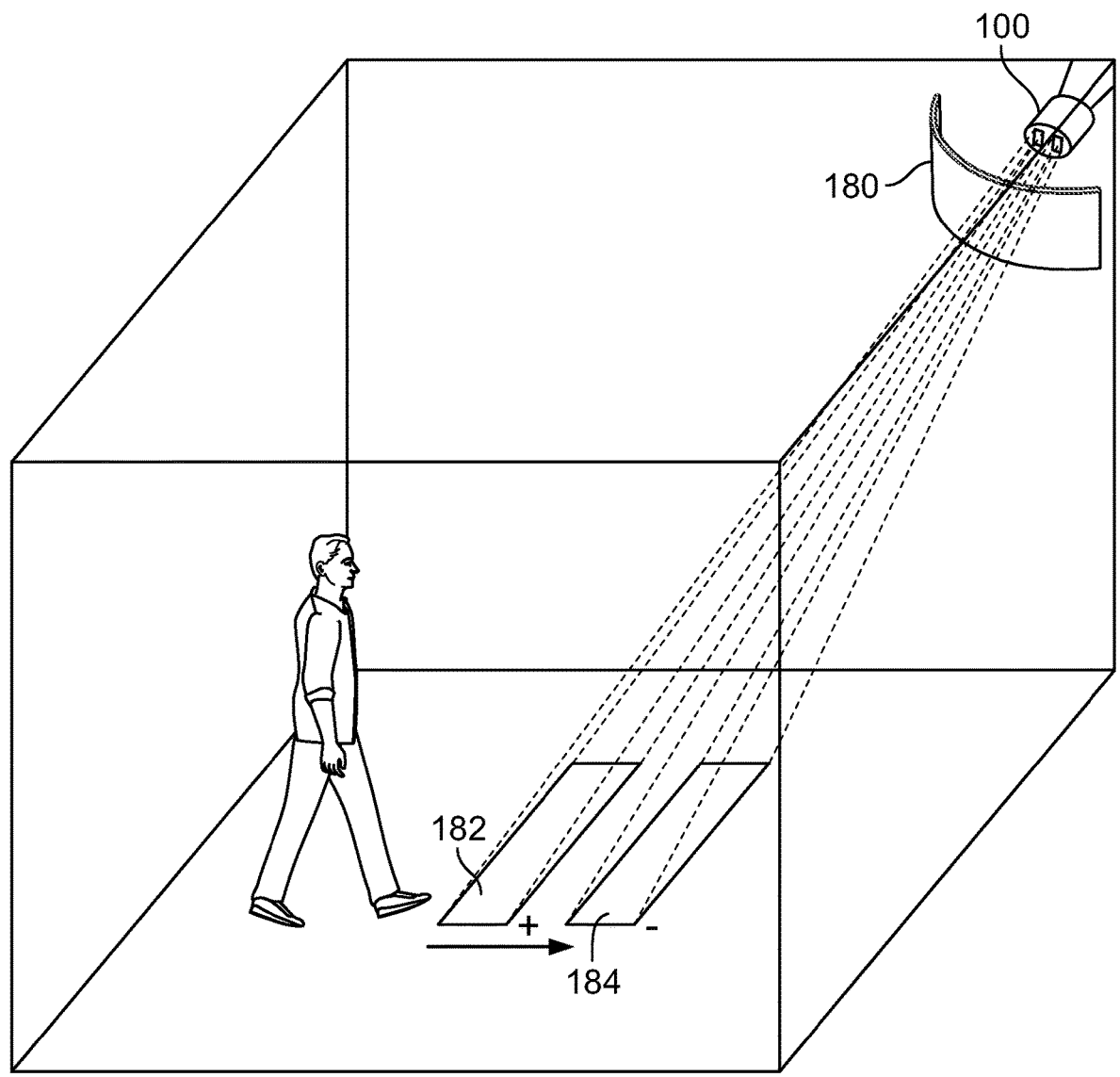
FIG. 1B shows a PIR sensor, field of view (FOV), and detection signal according to an embodiment of the disclosed subject matter.
Figure 1B:
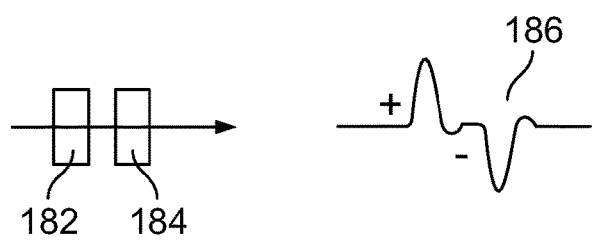

FIG. 1B shows the sensor installed, for example, in a home security system. As shown in FIG. 1B the Fresnel lens focuses radiation from the one or more distributed zones 182, 184 onto the radiation-sensitive elements 110, 120 of the sensor 100. When an individual enters the sensor 100 FOV and passes through the zones 182, 184, the sensor 100 generates an output signal 186.

Illustrative circuits, devices, and the like may be described herein in general terms with respect to interaction between several components/blocks. A person of ordinary skill in the art would appreciate that this description is not limiting in that such circuits and components/blocks can include those components or specified sub-components, some of the specified components or sub-components, and/or additional components, according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Components described herein may also interact with one or more other components not specifically described herein but known by those of ordinary skill in the art.

The PIR sensor 100 can be used to detect motion, for example, as part of a security system disposed in or around a premises. However, a conventional PIR sensor framework often generates false alerts based on noise, such as interference from external radiation sources. Furthermore, a PIR sensor that is part of a security system, e.g., a commercial home security system, may have design constraints that limit the size of the sensor, the battery power and the computation power of the device.

Signal to noise ratio (SNR) is a significant problem in PIR sensors that have limited size, battery power and computational power. Generally, all other factors being equal, the smaller the sensor, the lower the SNR and consequently the greater the potential for signal noise to result in false detections. The likelihood of a false detection increases further still with the introduction of environmental radiation sources.

Figure 2:
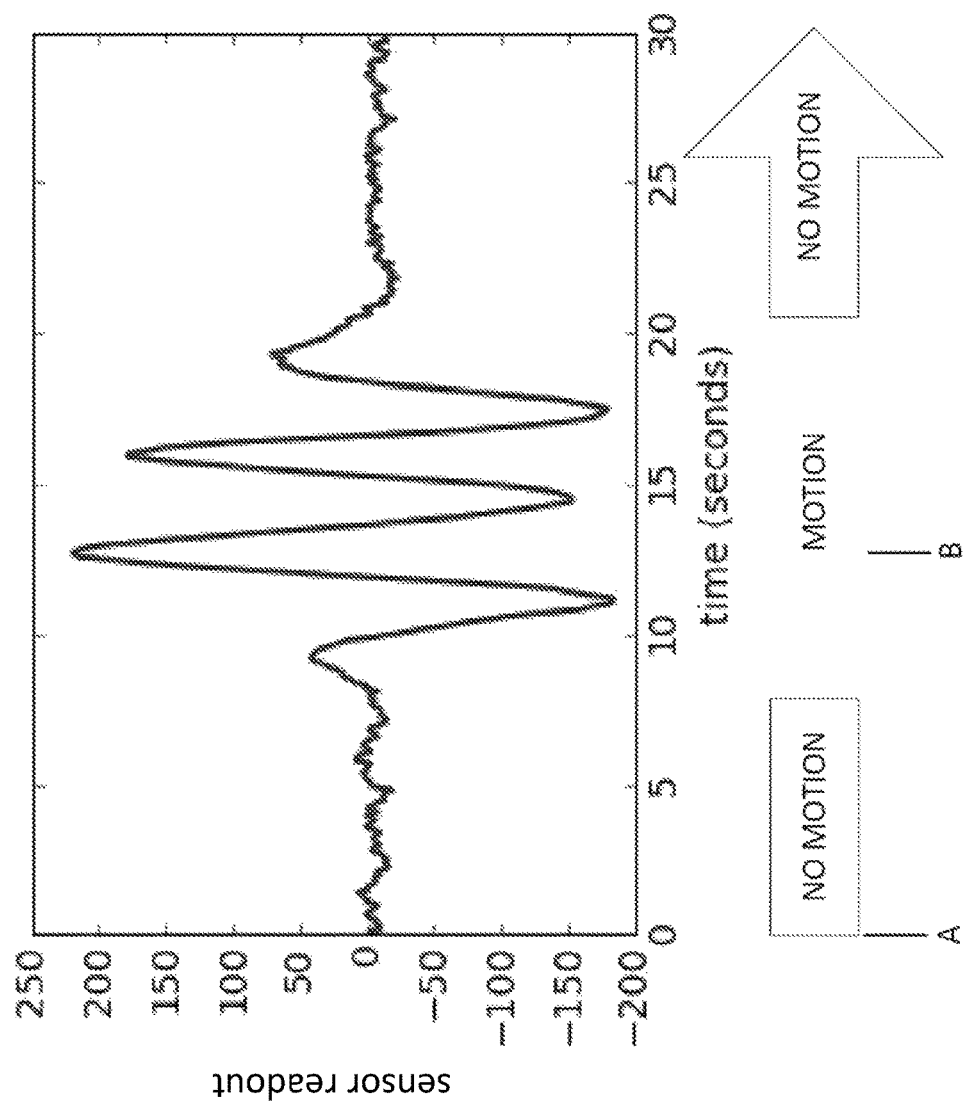
FIG. 2 shows a signal readout of a PIR sensor disposed in a room over a period of time with no environmental radiation sources.

FIG. 2 shows a signal readout of a PIR sensor disposed in a room over a period of time with no environmental radiation sources. From time A to B the room is empty. At time B an individual enters the FOV of the PIR sensor. A conventional PIR frameworks detects the motion of the individual by filtering the signal to remove noise and using signal thresholding to determine whether human detection has occurred. Using this method, human detection is determined to have occurred at time B when the signal crosses a threshold.

A disadvantage of this approach is that in many practical installation scenarios (e.g., a highly-mounted PIR sensor device near an air vent or with an air vent in the FOV) the heat interference signal strength is comparable to that of human motion, and thus introduces many false positive alarms.

Figure 3:
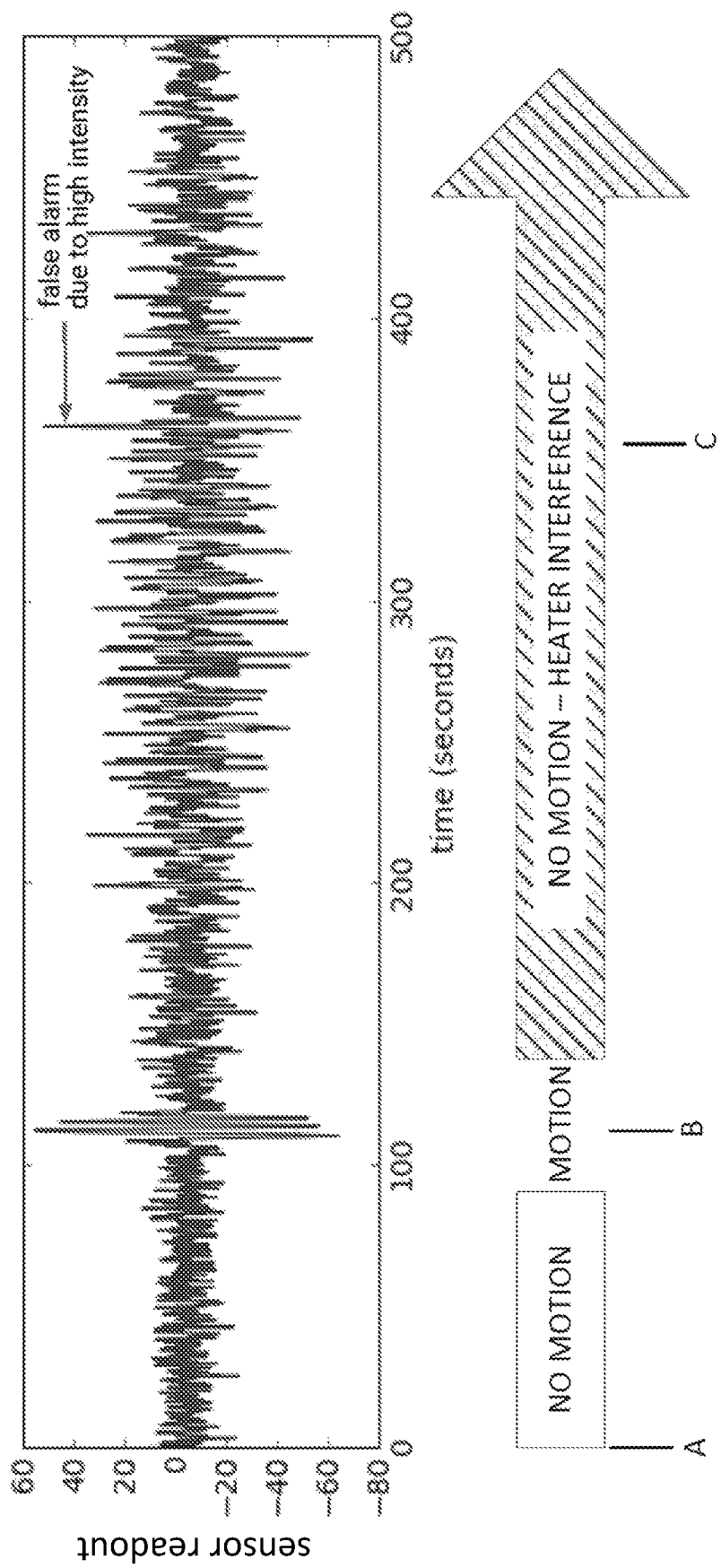
FIG. 3 shows a signal readout of a PIR sensor disposed in a room over a period of time with a heater present.

For example, FIG. 3 shows a signal readout of a PIR sensor disposed in a room over a period of time with a heater present. From time A to B the room is empty and the heater is turned off. At time B an individual enters the FOV of the PIR sensor. At time C the heater is turned on. Using basic conventional thresholding techniques, human detection is determined to have occurred at times B and C, although no human is present at time C.

A conventional solution to this problem is to use device temperature information to detect heaters and attempt to use offsets to avoid worst-case heat interference scenarios. However, because there is no perfect correlation between PIR signal variations and device temperature when considering large device-to-device variations, temperature-based control methods have limited advantages.

The disclosed subject matter solves the problem of false detection decisions triggered by environmental radiation by using a data-driven statistical framework that computes useful human motion features in the PIR signal domain itself, and thus is not affected by device variations and is robust for human motion detection, even in worst-case environmental heat scenarios.

Figure 4:
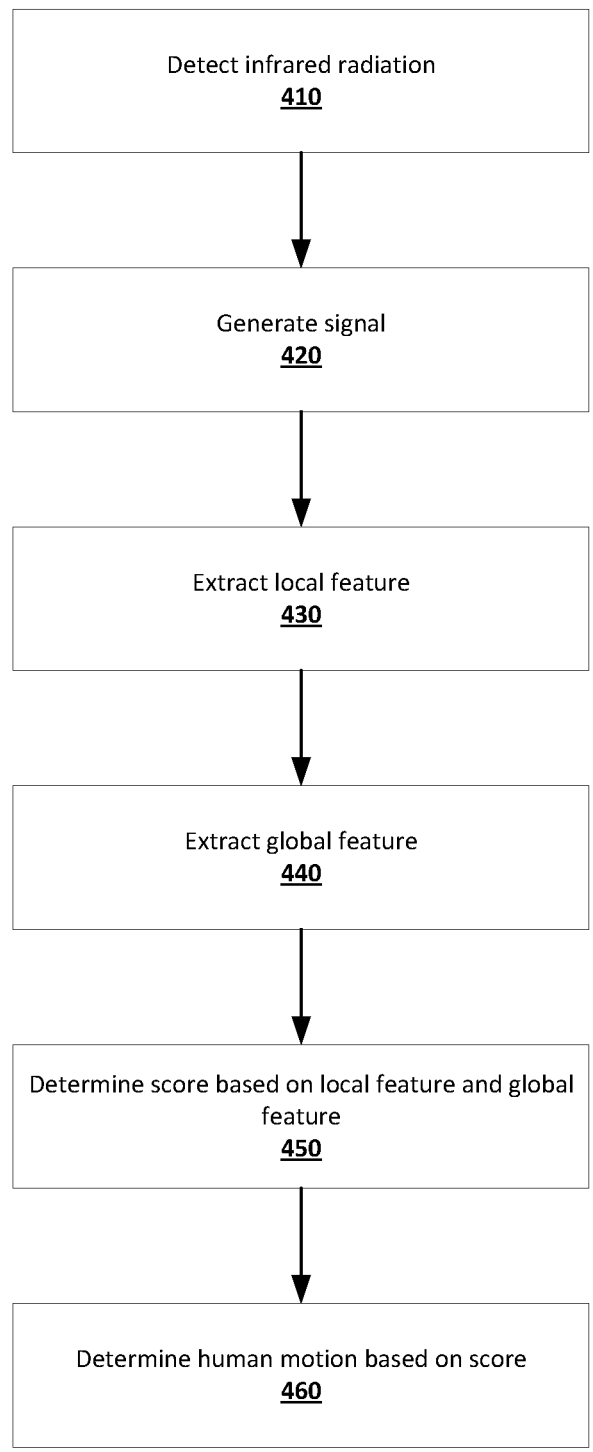
FIG. 4 shows a flowchart of an implementation of the disclosed framework, according to an embodiment of the disclosed subject matter.

FIG. 4 shows a flowchart 400 of an implementation of the disclosed framework. At operation 410 the PIR sensor detects radiation in its FOV and generates a signal at operation 420. A sample of the signal is processed by a processor to extract a local feature $c_{local}$ at operation 430 and a global feature $c_{global}$ at operation 440. At operation 450 the processor uses a scoring function to determine a score based on the local feature and the global feature. Based on the score, the processor determines whether a human is in the FOV at operation 460.

The local feature indicates a probability that a human is in the FOV, i.e., that transient human motion is the source that caused the radiation level indicated by the signal sample. The global feature indicates a probability that an environmental source, as opposed to a human source, is the cause for the radiation level indicated by the signal sample. The scoring function classifies the signal sample and includes predetermined parameters that can be tuned for accuracy, for example, via dataset training. Similarly, the parameters in the aforementioned feature extraction operations can be refined in offline training, using a labeled motion and non-motion dataset. The training dataset can include data from internal controlled testing runs, for example, PIR sensors disposed in actual houses.

In the disclosed framework, at each frame the PIR sensor records scene temperature based on the Fresnel lens patterns (spatial gradients). A PIR sensor value x at frame k can be expressed as:

$$x_k = \sum_i x_k^+(i) - \sum_j x_k^-(j) \quad \text{(Eq. 1)}$$

Given PIR sensor value readings $\{x_k\} k=1, 2, 3 \ldots$, the disclosed framework can detect human motion in real time at a low computational cost and with reduced false alerts due to environmental noise.

The local feature $c_{local}$ can be extracted (i.e., operation 430 of FIG. 4) from the signal sample $x_k$ using a computationally low-cost, lightweight function. In one implementation, the function can be defined as:

$$c_{local}(x_k) = |x_k| \quad \text{(Eq. 2)}$$

This function tracks the absolute deviation of the signal sample, under the notion that a deviation approaching a threshold predetermined to approximate human movement serves as an indication that human motion caused the sample to cross the threshold. Therefore, $c_{local}$ indicates a probability of immediate human intrusion into the FOV. The Eq. 2 function has a low computational cost, which factors into other advantages, such as battery life, as will be discussed later.

In another implementation, the $c_{local}$ extraction function can be defined as:

$$c_{local}(x_k) = Ax_k + b \quad \text{(Eq. 3)}$$

where A and b are parameters determined to achieve linear dimensionality reduction via, e.g., PCA or sparse encoding. Eq. 3 can achieve higher accuracy than Eq. 2 in some instances, but has a higher computational cost.

The global feature $c_{global}$ can be extracted (i.e., operation 440 of FIG. 4) from the signal sample $x_k$ using a relatively low-cost function. In one implementation, the function can be defined as:

$$c_{global}(x_k) = (1-\in)x' + \in |x_k - x_{k-1}| \quad \text{(Eq. 4)}$$

where $\in$ is a feature parameter determined through training on a dataset to achieve an slow total variation having a desired accuracy level and x' is a rolling average that is updated after every frame. In this implementation, $c_{global}$ becomes relatively high when radiation jitter is sustained over a long period of time. A sustained jitter generally may indicate that the source of radiation is a persistent environmental presence rather than a transient intruder, therefore, $c_{global}$ indicates a probability of environmental noise.

In another implementation, the $c_{global}$ extraction function can be defined as:

$$c_{global}(x_k) = (1-\in)x' + \in |x_k| \quad \text{(Eq. 5)}$$

In this case, $c_{global}$ is a slow follower of absolute deviation. This function generally may produce less accurate results than Eq. 4. However, it generally has a lower computational cost and still results in a $c_{global}$ that indicates a probability of sustained environmental noise.

The disclosed framework is also capable of using the global feature to identify the presence of an environmental aggressor. For example, when $c_{global}$ exceeds a predetermined threshold $R_{cg}$ for a given length of time $T_{cg}$, the processor can be configured to send a notification to the user to adjust the position of the sensor or adjust the environment. That is, the framework can determine that a current layout has a likelihood of eventually producing a false alarm.

The scoring function (i.e., operation 450 of FIG. 4) can be based on a classifier for separating motion indicators ($c_{local}$) from non-motion indicators ($c_{global}$). In one implementation, a linear classifier, such as support vector machines (SVM) can be used on the feature set to classify input. Using SVM, a linear scoring function $f(\vec{\sigma})$ can be defined as:

$$f(\vec{\sigma}) = a_0 + \sum_{k=1}^{n} a_k \vec{\sigma}_k \quad \text{(Eq. 7)}$$

where $a_n$ is an SVM coefficient determined by training on the dataset and $\vec{\sigma}$ is a sample vector determined based on the extracted features $c_{global}$ and $c_{local}$. In one implementation the sample vector $\vec{\sigma}$ can be computed, for example, by concatenating $c_{global}$ and $c_{local}$.

The sample vector may be provided to a scoring function to determine a score, which can then be compared to a predetermined threshold R to determine whether human movement has been detected in the FOV (i.e., operation 460 of FIG. 4).

Figure 5:
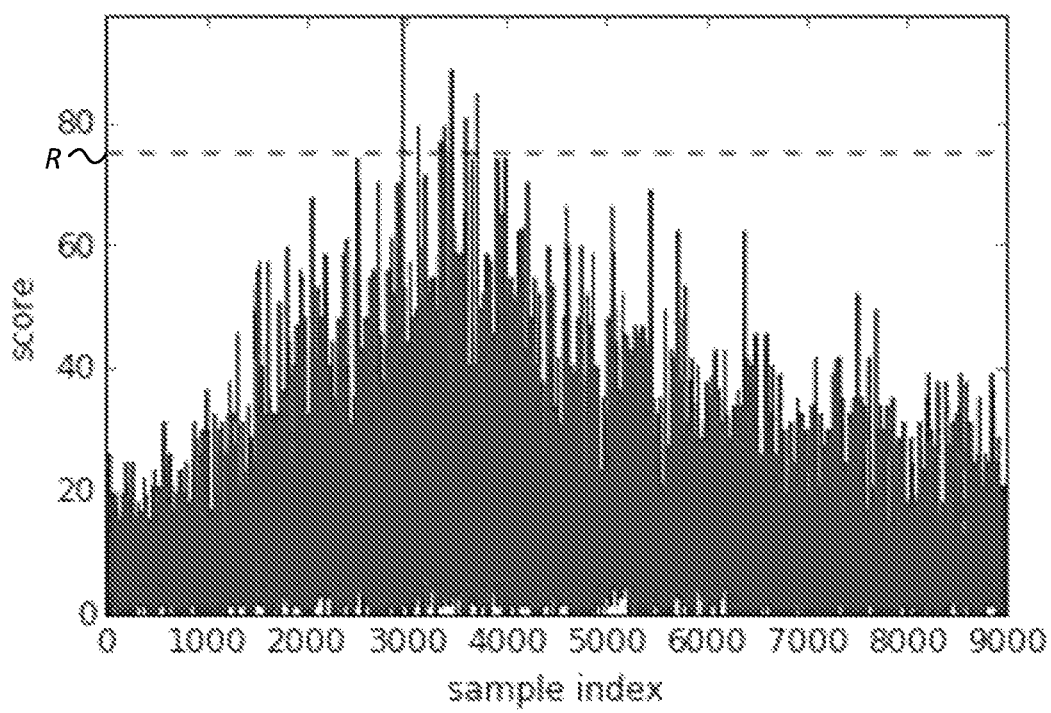
FIG. 5 shows a graph of test samples against corresponding scores using a conventional absolute value scoring algorithm.

FIG. 5 shows a graph of test samples against corresponding scores using a conventional absolute value scoring algorithm. The sample set was collected over a period of time from a PIR sensor in an environment with a heater turned on in the sensor's FOV, but no human motion. In contrast, the illustrative conventional algorithm determines human motion has occurred when the score exceeds threshold R. As can be seen, the conventional algorithm results in several false detection outcomes.

Figure 6:
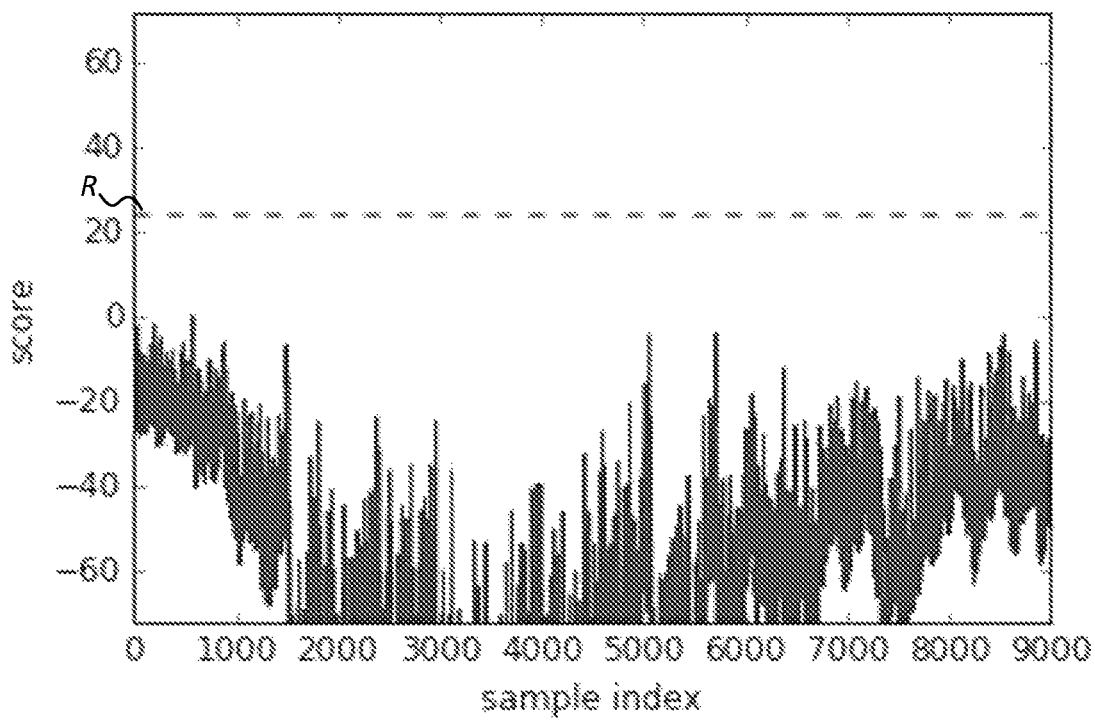
FIG. 6 shows a graph of test samples against corresponding scores using the disclosed framework, according to an embodiment of the disclosed subject matter.

FIG. 6 shows a graph of test samples against corresponding scores using the disclosed framework of FIG. 4. The sample set was collected over a period of time from a PIR sensor in the same environment with a heater turned on in the sensor's FOV, with no human motion. This disclosed framework successfully recognizes that no human motion has occurred within the FOV. Unlike the conventional method, the disclosed framework senses an environmental aggressor in the FOV and negatively corrects the score such that no false detections occur. The score remains below the threshold R.

In all of the implementations described above, when using an SVM classifier, the threshold R, SVM coefficients and feature parameter E, can be determined and/or refined by testing and labeling datasets obtained under controlled conditions. These values can be selected with different goals, for example, to improve accuracy, to decrease mean time to failure (MTTF) for the PIR sensor, or to increase the effective FOV. Generally, lowering threshold R increases the FOV, but lowers MTTF. Testing can be employed to determine a value for R that achieves a desired balance.

The disclosed framework is different from conventional approaches in that it functionally recognizes the statistics of motion and non-motion PIR signals and derives effective ways of separating the two signal sets in a data-driven way, thereby achieving high motion detection accuracy with low computational cost. For example, since the disclosed feature extraction operations are low-cost (in the worst case, a single matrix-vector multiplication even when the matrix is large) and the disclosed classification operation is low-cost (e.g., one dot product for SVM), the full framework pipeline can run at an acquisition frame rate of 10 Hz without noticeable battery power reduction.

In practice, the disclosed framework can achieve accurate results with a computational cost as low as 9 elementary arithmetic operations per frame, which can meet low-cost design restraints. In one implementation, a PIR sensor 100 can include a low-power processor that can compute a maximum of 10 elementary arithmetic operations per cycle. In one test implementation, keeping the number of operations under 10 resulted in the device having a determined active battery operation of at least 2 years. In addition to the framework only needing elementary arithmetic operations, no floating point numbers are required, further lowering the computational cost.

The number of instructions per cycle can be so low as to not exceed 6 instructions, where each instruction can be considered to be equivalent to a line of code or a step in an algorithm that may include one or more operations. With all of the above described low-cost features, the battery life of the PIR sensor has been shown in testing to be greatly improved over conventional techniques. For example, In some configurations, the disclosed PIR sensor framework can be implemented as a set of computer-readable instructions stored on a computer-readable storage medium to be implemented by a general-purpose processor, which may transform the general-purpose processor or a device containing the general-purpose processor into a special-purpose device configured to implement or carry out the instructions. Embodiments can be implemented using hardware that can include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as a buffer, register, RAM, ROM, flash memory, hard disk or other device capable of storing electronic information. The memory may store instructions adapted to be executed by the processor to perform the PIR sensor framework techniques according to embodiments of the disclosed subject matter.

PIR sensors including the framework as disclosed herein can also operate within a communication network, such as a conventional wireless network, and/or a sensor-specific network through which sensors may communicate with one another and/or with dedicated other devices. In some configurations one or more disclosed PIR sensors can provide information to one or more other sensors, to a central controller, or to any other device capable of communicating on a network with the one or more sensors. A central controller can be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller can be located locally with respect to the sensors with which it communicates and from which it obtains sensor data, such as in the case where it is positioned within a home that includes a home automation and/or sensor network. Alternatively or in addition, a central controller as disclosed herein can be remote from the sensors, such as where the central controller is implemented as a cloud-based system that communicates with multiple sensors, which can be located at multiple locations and can be local or remote with respect to one another.

Figure 7:
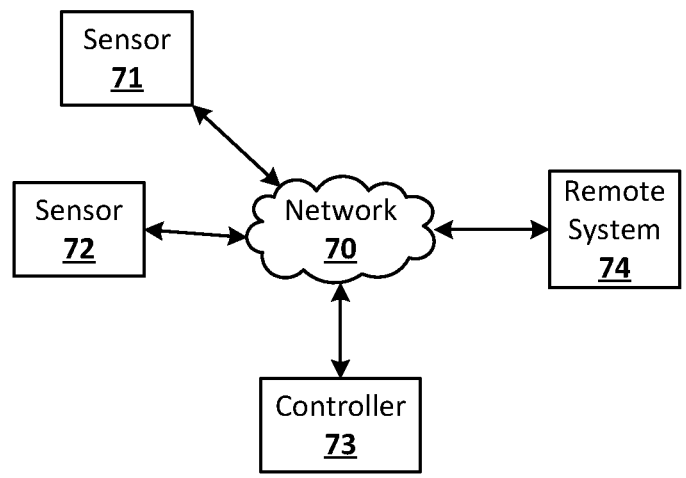
FIG. 7 shows an example of a sensor network, according to an embodiment of the disclosed subject matter.

FIG. 7 shows an example of a sensor network as disclosed herein, which can be implemented over any suitable wired and/or wireless communication networks. One or more sensors 71, 72, for example PIR sensors including the disclosed framework, may communicate via a local network 70, such as a Wi-Fi or other suitable network, with each other and/or with a controller 73. The controller can be a general- or special-purpose computer. The controller can, for example, receive, aggregate, and/or analyze information received from the sensors 71, 72, such as detection alerts, notifications, or environmental information. The sensors 71, 72 and the controller 73 can be located locally to one another, such as within a single dwelling, office space, building, room, or the like, or they can be remote from each other, such as where the controller 73 is implemented in a remote system 74 such as a cloud-based reporting and/or analysis system. Alternatively or in addition, sensors can communicate directly with a remote system 74. The remote system 74 can, for example, aggregate data from multiple locations, provide instruction, software updates, and/or aggregated data to a controller 73 and/or sensors 71, 72.

In some configurations, a remote system 74 can aggregate data from multiple locations, such as multiple buildings, multi-resident buildings, individual residences within a neighborhood, multiple neighborhoods, and the like. In general, multiple sensor/controller systems can provide information to the remote system 74. The multiple systems can provide data directly from one or more sensors as previously described, or the data can be aggregated and/or analyzed by local controllers such as the controller 73, which then communicates with the remote system 74. The remote system can aggregate and analyze the data from multiple locations, and can provide aggregate results to each location. For example, the remote system 74 can examine larger regions for common sensor data or trends in sensor data, and provide information on the identified commonality or environmental data trends to each local system.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Some portions of the detailed description are presented in terms of algorithms and symbolic representations of operations on data bits within a computer memory. These algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities such as, for example, measured levels of IR radiation within a specific physical space. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

The foregoing description, for purpose of explanation, has been described with reference to specific embodiments and implementations. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   detecting, with a passive infrared sensor (PIR), levels of infrared radiation in a field of view (FOV) of the PIR;
   generating a signal based on the levels of infrared radiation detected with the PIR over a period of time, the signal having values that exhibit a change in a level of infrared radiation as detected with the PIR;
   extracting a local feature from a sample of the signal by tracking an absolute deviation of the sample of the signal relative to a threshold predetermined to approximate human movement, wherein the local feature indicates a first probability that a human in the FOV caused the change in the detected levels of infrared radiation;
   extracting a global feature from the sample of the signal by a product of a feature parameter determined through training on a dataset to achieve a slow total variation and a rolling average value updated after every frame of the PIR, wherein the global feature indicates a second probability that an environmental radiation source caused the change in the detected levels of infrared radiation;
   determining a score based on the local feature and the global feature; and
   determining that a human motion has been detected in the FOV based on the score.

2. The method of claim 1, wherein the local feature ($c_{local}$) of a $k^{th}$ sample of the signal (x) is determined by the function:

$$c_{local}(x_k)=|x_k|.$$

3. The method of claim 1, wherein the local feature ($c_{local}$) of a $k^{th}$ sample of the signal (x) is determined by the function:

$$c_{local}(x_k)=Ax_k+b$$

where A and b are learned parameters determined, through training on a dataset of prior PIR values, to achieve linear dimensionality reduction.

4. The method of claim 1, wherein the global feature ($c_{global}$) of a $k^{th}$ sample of the signal (x) is determined by the function:

$$c_{global}(x_k)=(1-\varepsilon)x'+\varepsilon|x_k-x_{k-1}|$$

where $\varepsilon$ is a learned parameter determined through training on a dataset of prior PIR values, and where x' is a rolling average that is updated after every frame.

5. The method of claim 1, wherein the global feature ($c_{global}$) of a $k^{th}$ sample of the signal (x) is determined by the function:

$$c_{global}(x_k)=(1-\varepsilon)x'+\varepsilon|x_k|$$

where $\varepsilon$ is a learned parameter determined through training on a dataset of prior PIR values, and where x' is a rolling average that is updated after every frame.

6. The method of claim 1, wherein the classifier is a linear support vector machine (SVM).

7. The method of claim 6, wherein a number of elementary operations executed per sample of the signal to detect human motion is less than 10.

8. The method of claim 6, wherein a number of instructions per signal sample is less than 7.

9. The method of claim 1, further comprising transmitting a notification indicating that the FOV of the PIR is not optimal for human detection when the global feature remains above a threshold value for a predetermined length of time.

10. A passive infrared (PIR) sensor device, comprising:
    a plurality of radiation sensitive elements that detect radiation levels in a field of view (FOV) and generate charges based on the radiation levels;
    a circuit that receives the generated charges and generates a single output signal based on the charges; and
    a processor that receives the signal and extracts a local feature from a sample of the signal by tracking an absolute deviation of the sample of the signal relative to a threshold predetermined to approximate human movement and a global feature from the sample of the signal by a product of a feature parameter determined through training on a dataset to achieve a slow total variation and a rolling average value updated after every frame of the PIR, the local feature indicating a first probability that a human in the FOV caused a change in the detected radiation levels and the global feature indicating a second probability that an environmental radiation source in the FOV caused the change in the detected radiation levels,
    wherein the processor is configured
       to determine a score based on the global feature and the local feature, and
       to determine that a human motion has been detected in the FOV based on the score.

11. The device of claim 10, wherein the processer extracts the local feature ($c_{local}$) of a $k^{th}$ sample of the signal (x) by executing the function:

$$c_{local}(x_k)=|x_k|.$$

12. The device of claim 10, wherein the processer extracts the local feature ($c_{local}$) of a $k^{th}$ sample of the signal (x) by executing the function:

$$c_{local}(x_k)=Ax_k+b$$

where A and b are learned parameters determined, through training on a dataset, to achieve linear dimensionality reduction.

13. The device of claim 10, wherein the processor extracts the global feature ($c_{global}$) of a $k^{th}$ sample of the signal (x) by executing the function:

$$c_{global}(x_k)=(1-\varepsilon)x'+\varepsilon|x_k-x_{k-1}|$$

where $\varepsilon$ is a learned parameter determined through training on a dataset, and where x' is a rolling average that is updated after every frame.

14. The device of claim 10, wherein the processor extracts the global feature ($c_{global}$) of a $k^{th}$ sample of the signal (x) by executing the function:

$$c_{global}(x_k)=(1-\varepsilon)x'+\varepsilon|x_k|$$

where $\varepsilon$ is a learned parameter determined through training on a dataset, and where x' is a rolling average that is updated after every frame.

15. The device of claim 10, wherein the classifier is a linear support vector machine (SVM).

16. The device of claim 15, wherein a number of elementary operations executed by the processor per sample of the signal to detect human motion is less than 10.

17. The device of claim 15, wherein a number of instructions executed by the processor per signal sample is less than 7.

18. The device of claim 10, further comprising:

a communication interface configured to transmit a notification indicating that the environment within the FOV is not optimal for human detection when the processor determines that the global feature remains above a threshold value for a predetermined length of time.

19. A system, comprising:

a network;

a controller configured to transmit and receive data through the network; and at least one passive infrared (PIR) sensor device configured to transmit data to the controller through the network, the PIR sensor device comprising:

a plurality of radiation sensitive elements that detect radiation levels in a field of view (FOV) and generate charges based on the detected radiation levels;

a circuit that receives the generated charges and generates a single output signal based on the charges; and a processor that receives the signal and extracts a local feature from a sample of the signal by tracking an absolute deviation of the sample of the signal relative to a threshold predetermined to approximate human movement and a global feature from the sample of the signal by a product of a feature parameter determined through training on a dataset to achieve a slow total variation and a rolling average value updated after every frame of the PIR, the local feature indicating a first probability that a human in the FOV caused the change in the detected radiation levels and the global feature indicating a second probability that an environmental radiation source caused the change in the detected radiation levels, wherein the processor is configured to determine a score based on the global feature and the local feature and to determine that a human motion has been detected in the FOV based on the score.

20. The system of claim 19, wherein the processor extracts the local feature ($c_{local}$) of a $k^{th}$ sample of the signal (x) by executing the function:

$$c_{local}(x_k)=|x_k|$$

21. The system of claim 19, wherein the processor extracts the global feature ($c_{global}$) of a $k^{th}$ sample of the signal (x) by executing the function:

$$c_{global}(x_k)=(1-\varepsilon)x'+\varepsilon|x_k-x_{k-1}|$$

where $\varepsilon$ is a learned parameter determined through training on a dataset, and where x' is a rolling average that is updated after every frame.

22. The system of claim 19, wherein the classifier is a linear support vector machine (SVM).

* * * * *